Nov. 9, 1937.　　　H. W. PRICE ET AL　　　2,098,674
CLUTCH CONTROL MECHANISM
Filed Nov. 27, 1931
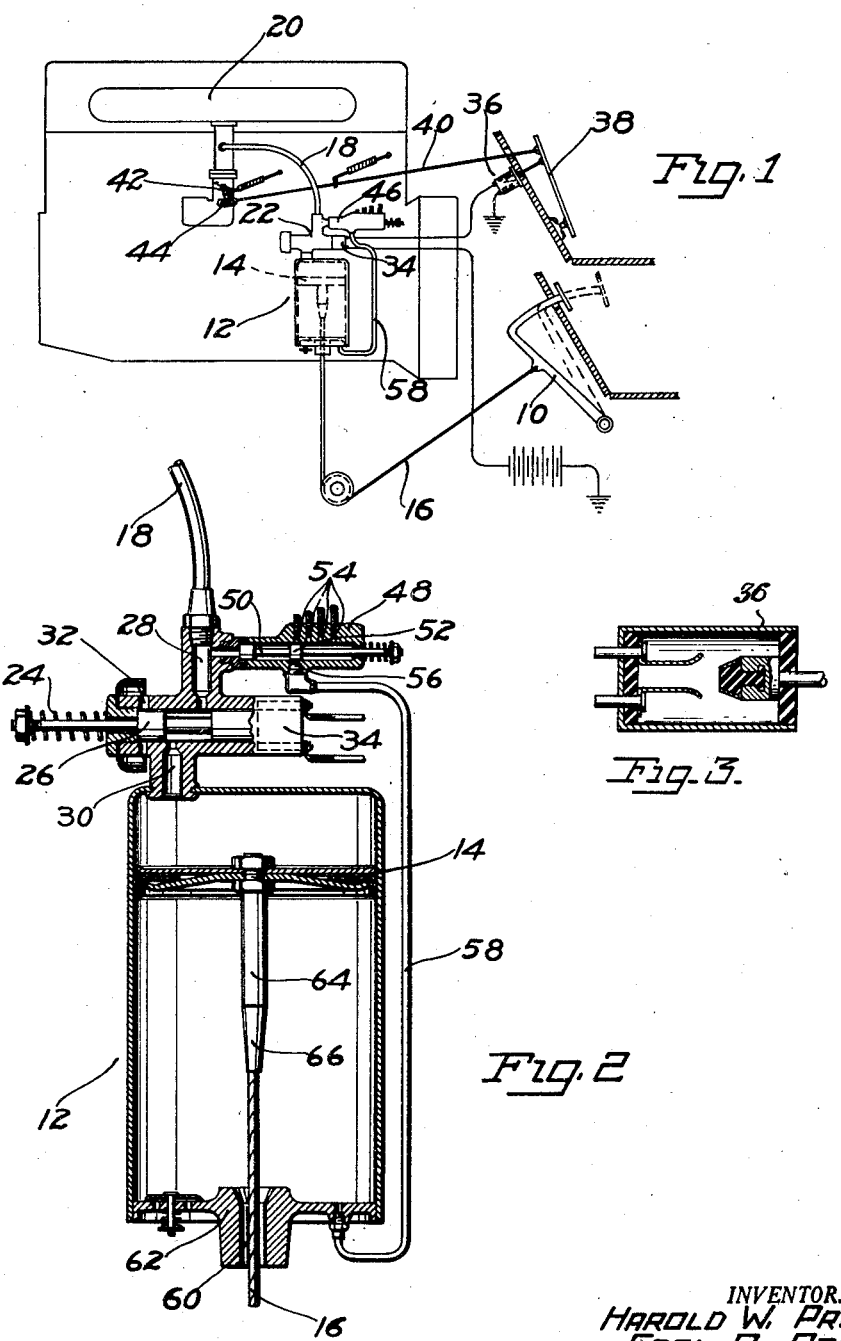
INVENTOR.
HAROLD W. PRICE
EARL R. PRICE
BY
ATTORNEY Patented Nov. 9, 1937

2,098,674

UNITED STATES PATENT OFFICE 2,098,674

CLUTCH CONTROL MECHANISM

Harold W. Price and Earl R. Price, South Bend, Ind., assignors to Bendix Aviation Corporation, South Bend, Ind., a corporation of Delaware Application November 27, 1931, Serial No. 577,659

4 Claims. (Cl. 192—.01)

This invention relates in general to a clutch control mechanism for automotive vehicles and in particular to a vacuum operated mechanism of this character automatically operable, with the closing of the throttle, to disengage the clutch and likewise automatically operable, with the opening of the throttle, to permit a reengagement of the clutch.

The principal object of the invention is to provide automatically operated means for controlling the clutch engaging function of the aforementioned vacuum operated mechanism, said means being variable in its operation according to the degree of manifold vacuum of the internal-combustion engine.

A further object of the invention is to provide means, cooperating with a double-ended vacuum operated motor, for controlling the rate of movement of the position of said motor, the mode of operation of said means and the consequent mode of operation of said piston being a function of the degree of manifold vacuum.

Yet another object is to provide an automatically operable bleeder valve for a clutch operating fluid motor, said valve to control the rate of clutch engaging movement of the movable element of said motor.

A further object is to provide a clutch controlling vacuum operated fluid motor, the rate of movement of the piston element of which is controlled both by the position of the piston within the motor by virtue of the motor construction and by the operation of an automatically operable bleeder valve, operable in accordance with the degree of manifold vacuum.

Other objects of the invention and desirable details of construction and combinations of parts will become apparent from the following description of a preferred embodiment, which description is taken in conjunction with the accompanying drawing, in which:

Figure 1 is a diagrammatic view illustrating the essential elements of the vacuum operated clutch controlling mechanism constituting the invention; and Figure 2 is a sectional view disclosing the details of the fluid motor, the three-way control valve for the motor and the automatically operable bleeder valve, said elements being disclosed in their clutch released position; and Figure 3 is a view disclosing, in detail, the accelerator operated switch mechanism of Figure 1.

Referring now to the embodiment of the invention illustrated diagrammatically in Figure 1, there is disclosed a clutch pedal 10 adapted to operate a conventional clutch, not shown. The pedal is adapted to be automatically moved to its clutch disengaged position, shown in full lines in Figure 1, by a vacuum operated double-ended fluid motor 12, the reciprocable piston 14 of which is connected to the pedal by a flexible cable or equivalent connection 16. The motor is preferably vacuum operated, a conduit 18 serving to interconnect one end of the cylinder of the motor with the intake manifold 20 of the internal combustion engine. An electrically operated three-way valve 22 is interposed in the circuit between the manifold and motor to control the operation of the latter.

As is well-known in the art, a vacuum of some twenty inches of mercury is induced in the manifold at closed throttle by the pumping action of the engine pistons, and this evacuated condition of the manifold serves, by virtue of the connection with the motor, to evacuate and energize the latter to disengage the clutch; therefore, with the disclosed construction the clutch is disengaged when and if the control valve 22 is opened and the engine throttle is closed.

According to one feature of the invention, the valve 22 is opened to evacuate the motor by means of a spring 24 which retains a spool valve member 26 to the left, Figure 2, to maintain a fluid transmitting connection between the conduit 18 and the motor via ports 28 and 30 in the valve casing. The valve is closed, to vent the motor via an atmospheric port 32 and permit an engagement of the clutch, by electrically operated means comprising a solenoid 34 energized by the closing of a switch 36, said switch being closed just prior to the opening of the engine throttle by an accelerator pedal 38. The accelerator pedal is preferably connected by a rod 40 with the butterfly operating lever 42 of the carburetor, a lost motion or slip joint 44 being provided at the connection between the rod and butterfly lever.

Referring now to the operation of the mechanism thus far described, release of the accelerator pedal 38 serves first to completely close the throttle and the last increment of movement of the pedal permits the switch 36 to be opened to deenergize the solenoid 34 and open the control valve 22 to disengage the clutch. A one-way check valve 63 is incorporated in the lower end wall of the fluid motor to permit the admission of air to the lower end of the motor as the upper end is evacuated to thus facilitate the clutch disengaging operation of the motor. Actuation of the accelerator pedal effects a reversal of the above cycle of operations, the clutch being engaged as the engine speed is increased.

The invention is particularly directed, however, to means for automatically controlling the rate of clutch engagement; that is, the rate of movement of the driving clutch plate. This is desired in order to in general simulate manual control of the clutch, and more particularly to effect an engagement of the clutch plates when the R. P. M. of the driving clutch plate is equal to or approximately equal to that of the driven plate.

To this end a bleeder valve member 46 is secured to the body of the three-way control valve 22. This valve comprises a casing 48 housing a reciprocable spring pressed spool valve member 50, the right piston element 52 of which is preferably arranged to cover the extreme left of a plurality of set screw adjustable air bleed openings 54 when the valve member is drawn to the left by vacuum, all as disclosed in detail in Figure 2. The valve casing is provided with a port 56 connected, by a conduit 58, with the non-suction or compression side of the double-ended fluid motor 12.

Describing the operation of the bleeder valve, opening of the engine throttle serves to decrease the manifold vacuum, permitting the spool valve member 50 to be drawn to the right by its spring and uncover one or more of the openings 54 to thereby determine the rate of efflux of air from the compression side of the motor during the clutch engaging operation. It will be noted, however, that due to the lost motion at 44 that the three-way valve 22 is opened, to initiate the movement of the motor piston 14, before the throttle is opened to operate the bleeder valve. The first phase of movement of the piston 14 is somewhat rapid by virtue of a relatively high rate of efflux of air through an opening 60 in a hub 62 of the motor. The piston 14 is provided with a connecting rod 64 having a tapered end 66, and after the body of the rod is housed within the bore of the hub 62 the remaining stroke of the piston is controlled by the aforementioned bleeder valve. The piston and hub construction just described form no part of the instant invention, being that described and claimed in our copending application No. 568,402, filed October 12, 1931.

It will thus be seen that the mode of movement of the piston and its connected clutch pedal in the clutch engaging operation is predetermined, during the first and substantial part of its throw, by the structure of the motor parts and that the clutch plate contacting increment of movement is determined by the degree of manifold vacuum which controls the position of the movable element of the bleeder valve, the latter controlling the rate of efflux or bleed of air from the motor.

For example, if the throttle is appreciably opened to engage the clutch with the transmission in high gear, there is a corresponding appreciable lowering of the manifold vacuum with the consequent rapid engagement of the clutch, as is desired.

There is thus provided a very simple automatically operable means for controlling the rate of clutch plate movement in accordance with the degree of manifold vacuum, and which means in its operation closely simulates manual control of the engagement of the clutch.

While one illustrative embodiment has been described, it is not my intention to limit the scope of the invention to that particular embodiment, or otherwise than by the terms of the appended claims.

We claim:

1. A clutch operating mechanism for an automotive vehicle provided with an internal-combustion engine having an intake manifold and further provided with a clutch, said operating mechanism comprising a vacuum operated double-ended fluid motor and a control valve for said fluid motor, and valve means connected to the compression side of said motor and also connected to said manifold, said valve adapted to control the clutch engaging function of said motor, said valve being operable in accordance with the degree of manifold vacuum to determine the rate of efflux of air from the compression side of said motor.

2. A clutch operating mechanism for an automotive vehicle provided with an internal-combustion engine having an intake manifold and further provided with a clutch, said operating mechanism comprising a vacuum operated double-ended fluid motor, a control valve for said fluid motor, and valve means connected to said motor and manifold for controlling the clutch engaging function of said motor, said means being operable in accordance with the degree of manifold vacuum to determine the rate of efflux of air from the compression side of said motor, said first mentioned motor controlling valve being operable, to initiate the clutch engaging operation of the motor prior to the operation of said second mentioned valve means.

3. In an automotive vehicle provided with an internal-combustion engine and a clutch, said engine having an intake manifold, a vacuum operated double-ended fluid motor connected to said clutch, a fluid transmitting connection between said motor and manifold, a control valve for said motor incorporated in said connection, a valve for controlling the clutch engaging function of said motor, a connection between said valve and aforementioned fluid transmitting connection and a second connection between said valve and compression side of said double-ended motor.

4. In clutch operating mechanism for automobiles, a source of vacuum, a vacuum cylinder and piston mechanism provided with means for vacuum connection and for air relief, and means for controlling the air relief associated with said cylinder and piston mechanism to afford relatively unrestricted relief during the first part of the stroke of the piston followed by relatively restricted relief, said controlling means including a pressure differential operated valve piston, and resilient means for biasing said valve piston to its valve open position.

HAROLD W. PRICE.
EARL R. PRICE.